United States Patent Office 3,292,237
Patented Dec. 20, 1966

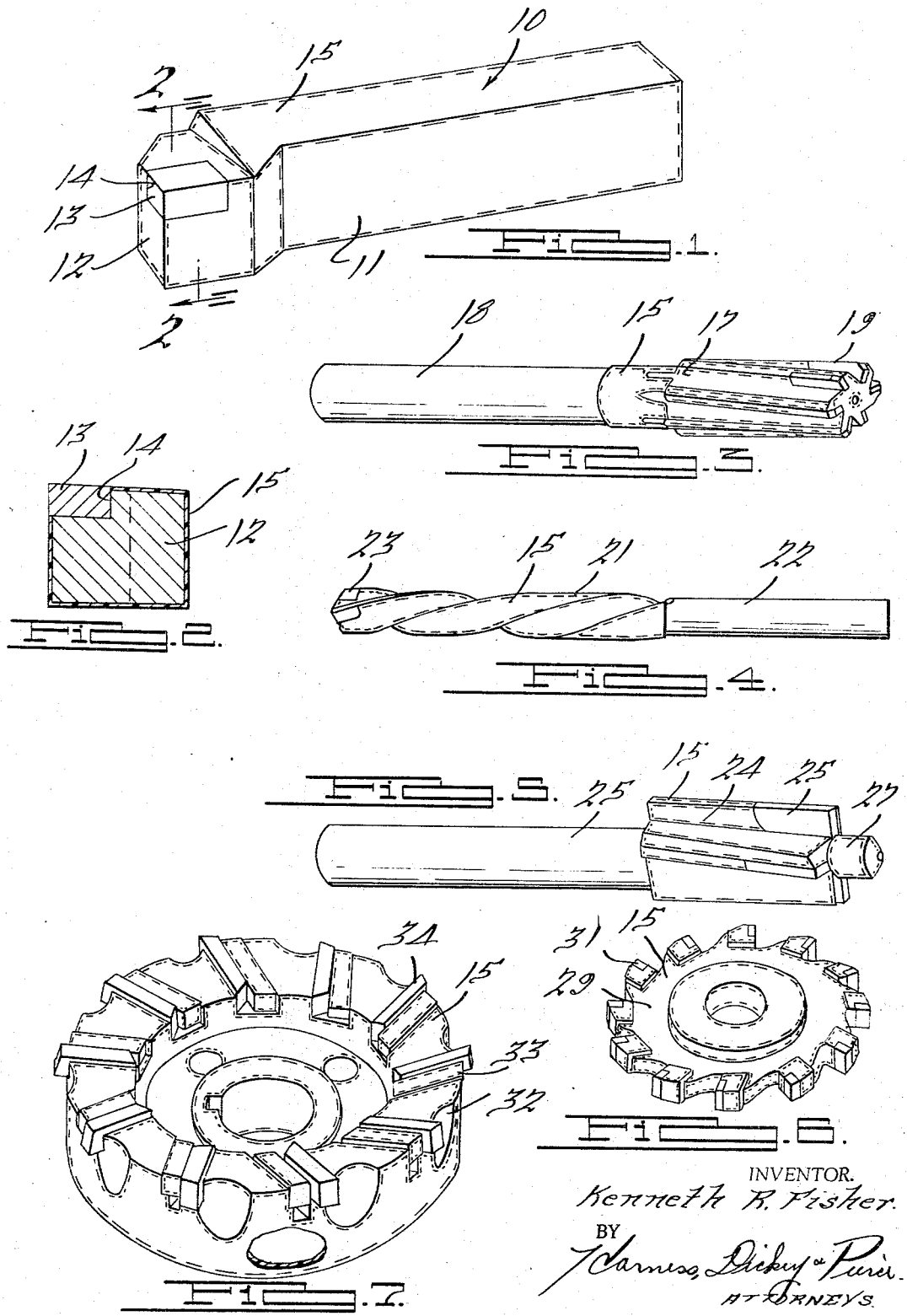

3,292,237
VIBRATION DAMPING MEANS FOR TOOLS
Kenneth R. Fisher, Grosse Pointe, Mich., assignor to Universal American Corporation, New York, N.Y., a corporation of Delaware
Filed Sept. 19, 1963, Ser. No. 310,015
1 Claim. (Cl. 29—95)

This invention relates to tools having a coating thereon and particularly to a tool having a thin plastic coating on the body thereof to reduce vibration chatter and breakage.

The hard cutting edges of tools chip when subjected to vibration and chatter especially when the cutting blades are made of hard material such as tungsten carbide and the like. It was found that this vibration can be dampened by applying a coating of plastic material to the body of the tool leaving the cutting edges free to perform the cutting operation. By thus reducing the vibration, chatter is also reduced so that the chipping of the cutting edge is in most cases eliminated, thereby substantially increasing the tool life.

Accordingly, the main objects of the invention are: to dampen the vibration of a tool to prevent chatter and damage to the cutting edge of the tool blade; to apply a plastic coating to the body of a tool to dampen the vibration thereof for increasing the tool life; to bond a plastice material to the body of a tool to reduce the vibration thereof and the chipping of the cutting blade, and in general, to increase the life of a tool by reducing the vibration and the chatter resulting therefrom.

Other objects and features of novelty of the invention will be specifically pointed out or will become apparent when referring, for a better understanding of the invention, to the following description taken in conjunction with the accompanying drawing, wherein:

FIGURE 1 is a perspective view of a cutting tool embodying features of the present invention;

FIG. 2 is a sectional view of the structure illustrated in FIG. 1, taken on the line 2—2 thereof;

FIG. 3 is a perspective view of a reamer having a vibration deadening coating thereon embodying features of the present invention;

FIG. 4 is a view in elevation of a drill having a coating thereon embodying features of the present invention;

FIG. 5 is a perspective view of a counterbore tool having a coating thereon embodying features of the present invention;

FIG. 6 is a view of a milling cutter having a coating thereon embodying features of the present invention; and FIG. 7 is a perspective view of a face milling cutter having a coating on the body thereof embodying features of the present invention.

Referring to the figures, and particularly to FIGS. 1 and 2, a cutting tool 10 is illustrated having a body 11 and a head 12 provided with an insert 13 brazed or otherwise secured in a recess 14 in the head. The insert 13 is made of hard material such as tungsten carbide which is damaged by shock, the portions along the cutting edge chipping off when subjected to excessive chatter. A coating 15 of plastic material is adhered over the body and head of the tool 10 for the purpose of dampening the vibration and thereby reducing or eliminating the chatter which occurs at the cutting point or edge of the insert. Polyethylene, polypropylene and the vinal resins are suitable as coating materials for the tools. The vinal resins are particularly suitable having toughness and readily bonding features. The metal of the tool may first be treated with a phosphate or like coating to produce roughness to the surface so that an adhering material known in the art to be suitable will securely bond the plastic thereto. The plastic is preferably mixed with a solvent so that it can be applied by dipping, spraying, brushing, and the like. The base material may be first adhered to the roughened surface and the plastic material bonded thereto as the solvent is driven therefrom when the tool is heated. The coating need not be heavy, one between .005 inch to .001 inch will dampen the vibration occurring during the cutting operation. This coating is illustrated as covering the entire tool body 11 and head 12 so that the clamping occurs on the portion of the body which is coated. When the coating on the body prevents the vibration, the possibility of chatter is substantially eliminated and when chatter is reduced or eliminated then the chipping of the brittle insert 13 is likewise reduced or eliminated and its life is substantially extended.

In FIG. 3, a reamer is illustrated having a body 17 and a driving shank 18 with the body covered with the coating of the material 15 to reduce the vibration and the chatter and the chatter which prevents the chipping of the inserts 19. It is to be understood that the coating could be extended over the shank 18 but since the vibration occurs through the body the coating thereon in most cases is sufficient.

In FIG. 4, a drill is illustrated having a fluted body 21 and a driving shank 22 with the fluted body containing a coating 15 of the plastic material for the purpose of eliminating or reducing the vibration and the chatter and the chipping of the insert cutting ends 23.

In FIG. 5, a countersinking tool is illustrated having a body 24 and a driving shank 25 with the body provided with the coating 15 for reducing the chatter on the cutting inserts 25 and thereby the chipping of the cutting edges which might otherwise occur. It will be noted that the countersinking tool has a pilot end 27 which is herein illustrated as having the coating applied thereto which in some instances adds materially to the reduction of vibration and chatter. It is to be understood that the plastic material could be applied over the entire tool including the shank, the pilot end, the body and also the inserts except for the cutting edge thereof. It will be noted that the exposed side of the insert is also covered with the plastic material because of the extended area thereof to aid in the reduction of vibration.

In FIG. 6 a plain and side mill cutter is illustrated having the entire area of the body 29 covered with the plastic coating 15 except for the cutting inserts 31 forming the cutting teeth of the milling cutter. The plastic material reduces the vibration and therefore the chatter on the teeth which eliminates the breaking of the cutting edges of the inserts.

In FIG. 7, a face mill is illustrated having a body 32, the entire area of which is covered by the plastic coating 15. The clamping elements 33 are also shown as being coated and it is within the purview of the invention to provide a coating on the cutting inserts 34 if this is found desirable to assist in the elimination of vibration and the chipping at the cutting edges.

All of the tools herein illustrated have the coating of dampening material bonded to the entire body portions thereof. In some instances the entire tool is coated except for the cutting edges to provide greater protection against vibration, chatter and chipping. The drive shanks for the tool need not have the coating applied thereto as sufficient dampening occurs to prevent or substantially reduce the chatter on the cutting inserts. The entire tool, as well as the inserts, except for the cutting edges, may have the dampening material bonded thereto to provide the greatest protection against chatter and the chipping of the cutting edges of the inserts. In any instance, the application of the dampening material bonded to the body or other portions of the tool, substantially assists in increasing the tool life by reducing or eliminating the chatter at the cutting edge which caused the edge to crumble and chip away and thereby damage or completely destroy the tool.

What is claimed is:

A cutting tool having a body and a cutting head, a hard fragile insert supported by said cutting head, means for roughing the surface of said body, a material to which a plastic material will bond secured to said roughened surface, and a plastic material bonded to said secured material.

References Cited by the Examiner

UNITED STATES PATENTS

| | | |
|---|---|---|
| 1,887,372 | 11/1932 | Emmons. |
| 2,426,359 | 8/1947 | Laukheet _____ 29—96 |
| 2,607,108 | 8/1952 | See _____ 29—96 |
| 2,680,283 | 6/1954 | See. |

FOREIGN PATENTS 874,114  8/1961  Great Britain.

OTHER REFERENCES

Article from Tool and Die Journal on vibration damping by A. W. Ehlers, July 1946 issue, pp. 81–83.

Araldite—A New Adhesive, Coating, and Casting Resin, by C. F. Moss, B. Sc. from British Plastics Magazine, November 1948 issue, pp. 521–527.

Article from American Machinist/Metalworking Manufacturing Magazine, Damping Offsets, Ceramic-tool Buttleness, by Masamito Minzuno, Dec. 26, 1960 issue, pp. 63 and 64.

WILLIAM W. DYER, JR., *Primary Examiner.*

H. L. HINSON, *Assistant Examiner.*